United States Patent [19]

Belik et al.

[11] Patent Number: 4,469,369

[45] Date of Patent: Sep. 4, 1984

[54] MODULE ELEMENT OF CITY BUS OR LIKE VEHICLE AND BUS ASSEMBLED ON THE BASIS OF SUCH MODULE ELEMENTS

[75] Inventors: Vladimir K. Belik; Bogdan V. Kurach; Yaroslav S. Trach, all of Lvov, U.S.S.R.

[73] Assignee: Vsesojuzny Konstruktorsko-Experimentalny Institut Avtobusostroenya, Lvov, U.S.S.R.

[21] Appl. No.: 572,954

[22] PCT Filed: Mar. 7, 1980

[86] PCT No.: PCT/SU80/00043

§ 371 Date: Nov. 4, 1981

§ 102(e) Date: Nov. 4, 1981

[87] PCT Pub. No.: WO81/02555

PCT Pub. Date: Sep. 17, 1981

Related U.S. Application Data

[63] Continuation of Ser. No. 320,965, Nov. 4, 1981, abandoned.

[51] Int. Cl.³ .................. B62D 23/00; B62D 31/02; B62D 47/02
[52] U.S. Cl. .................. 296/197; 105/329 R; 105/393; 296/178
[58] Field of Search .................. 296/29, 178, 196, 197; 105/329 R, 393

[56] References Cited

U.S. PATENT DOCUMENTS

| | | | |
|---|---|---|---|
| 2,606,058 | 8/1952 | Chausson | 296/178 |
| 3,584,911 | 6/1971 | Coletto, Jr. | 296/197 |
| 3,779,596 | 12/1973 | Ritter | 296/179 |
| 3,794,374 | 2/1974 | Manning | 296/197 |
| 4,221,426 | 9/1980 | Wardill | 296/178 |
| 4,254,987 | 3/1981 | Leonardis | 296/197 |
| 4,283,086 | 8/1981 | Morin | 296/178 |
| 4,422,685 | 12/1983 | Bonfilio et al. | 296/197 |

FOREIGN PATENT DOCUMENTS 2373433 7/1978 France .................. 296/197

OTHER PUBLICATIONS

"Lastauto omnibus", Stuttgart, No. 10, Oct. 1974, pp. 44-47, (with English Translation).

Primary Examiner—Richard A. Bertsch
Attorney, Agent, or Firm—Fleit, Jacobson, Cohn & Price

[57] ABSTRACT

A module element (1) comprises a transverse window section (2) of the body, open at the ends thereof, a chassis unit (4) including a pair of wheels (20) disposed under a window (12) and connected to the window section (2) by means of a suspension (21), and a transverse door section (3) of the body, open at the ends thereof, and butt-jointed with the window section (2).

A bus assembled on the basis of the module elements (1) comprises an intermediate body section (31) disposed between the module elements (1) and corresponding in the dimensions thereof to one of the sections (2 or 3) incorporated into the module element (1). The module elements (1) and the intermediate section (31) disposed therebetween are located between front and rear elements (29 and 30) of the body.

The buses of the same standard size series differ in terms of the number of included module elements (1).

5 Claims, 9 Drawing Figures

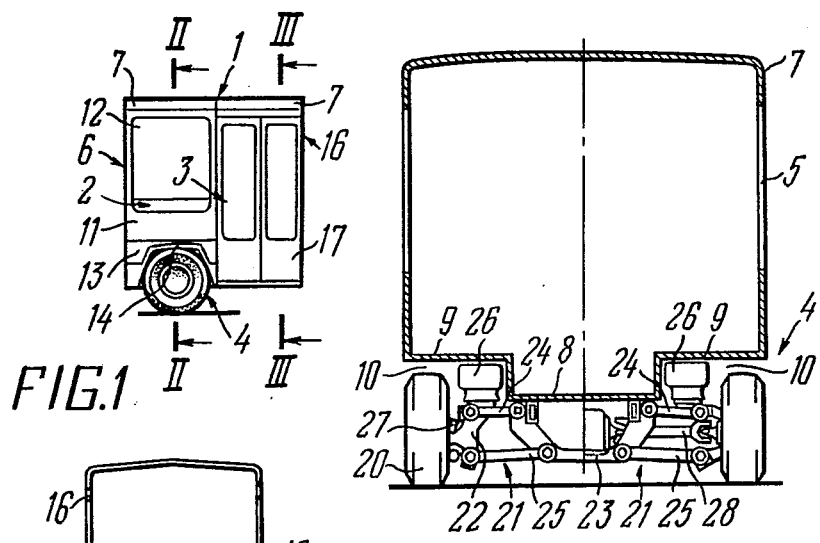
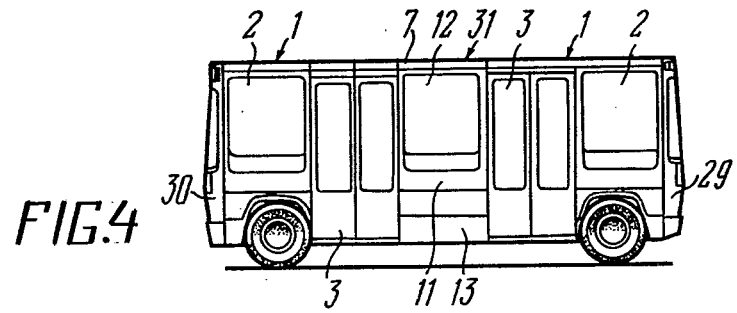
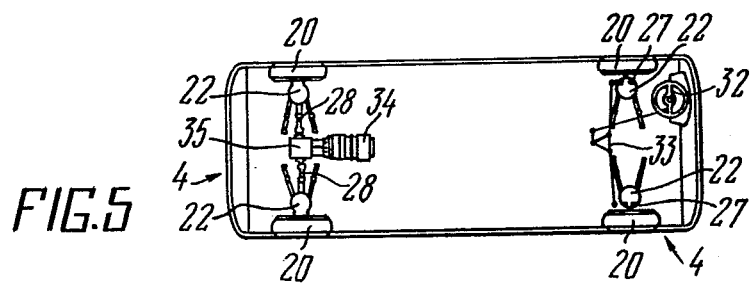

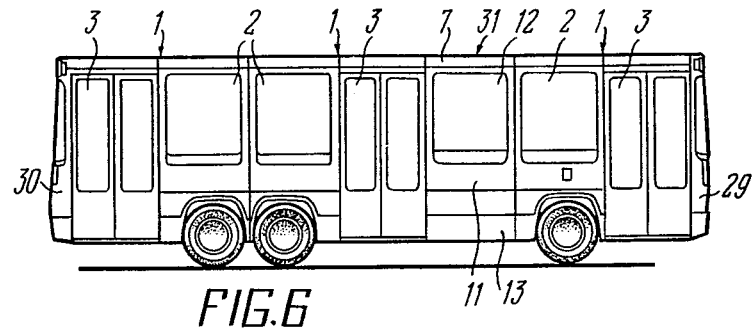
FIG.6
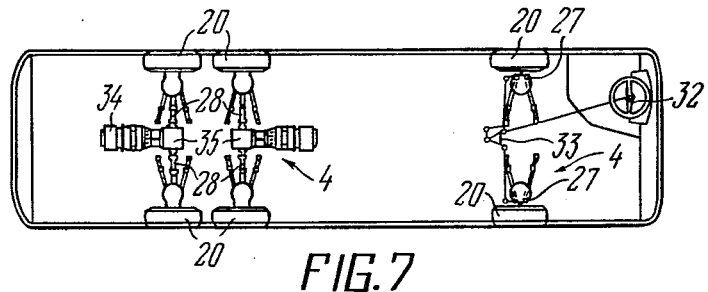
FIG.7
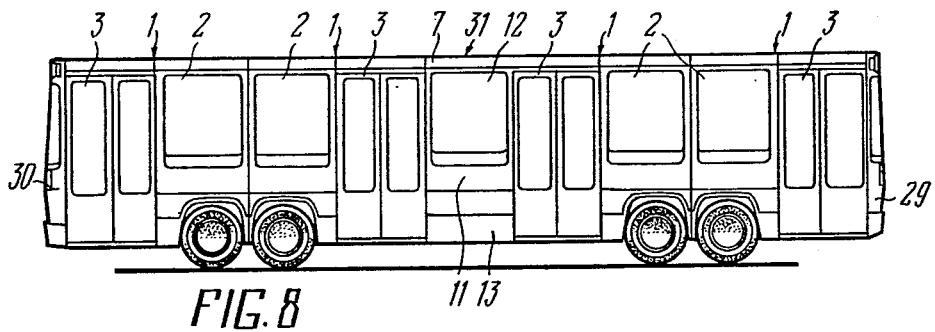
FIG.8
FIG.9
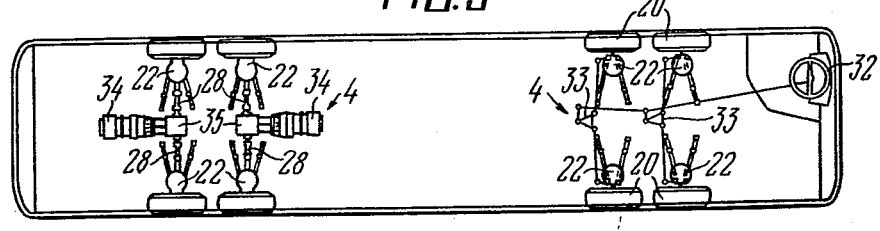

MODULE ELEMENT OF CITY BUS OR LIKE VEHICLE AND BUS ASSEMBLED ON THE BASIS OF SUCH MODULE ELEMENTS

This application is a continuation, of application Ser. No. 320,965, filed Nov. 4, 1981, now abandoned.

TECHNICAL FIELD

The invention relates to the art of transport engineering, and particularly to module elements of a city motor bus or similar vehicle and to motor busses assembled from such module elements.

The terms "standard size series", "series" are referred hereinafter to a combination of articles of the same constructive type (members of the series) and which differ in terms of numerical values of one or several parameters, said values being disposed in the order of progressive increase.

The term "module element" is referred hereinafter to a structural unit forming a part of the article, the quantity of this unit determining the place (serial number) of this article within the standard size series.

BACKGROUND ART

Ever increasing needs of the urban population in public vehicles can be satisfied only provided that the level of specialization of production of corresponding vehicles in high, said level allowing mechanization and automation of the production process to be carried out on a wide scale. The required level of specialization of the production processes is in turn inseparable from the high degree of unification of sub-assemblies and parts of these vehicles.

Meanwhile, at present the designs of vehicles even within one kind of transport are unnecessarily various.

In particular, the Soviet industry puts on the market a series of motor buses having different lengths and passengers (load-carrying) capacity, consisting of motor buses of an original single-unit structure based on chassis units of trucks.

Bodies of these motor buses are unified practically only in terms of used (starting) materials and some assemblies of interior equipment. This fact results in a very low level of unification of such a series, said level being of about 10%.

Known in the art is a series of motor buses differing in their lengths and capacities and provided with bodies comprising unified front and rear end face portions (elements, doors, windows, and body panels of several standard sizes, and interior equipment ("Lastauto-Omnibus", FRG, 1974, No. 10, pp. 44-47). The level of unification of the buses of the above series reaches 25 to 30%.

A further step to increasing the level of unification of the standard size series of vehicles consists in the provision of said vehicles assembled from the module elements.

Known in the art is a module element of a city motor bus or similar vehicle, e.g. trolley bus, which is a transverse window section of the body, open at the end portions, each of the side walls of said section being provided with a window (U.S. Pat. No. 3,794,374).

In a motor bus assembled from such module elements, the parts and assemblies of the body are unified practically completely, the module elements of said body being joined end to end and disposed between front and rear elements which are also unified within the limits of the standard size series (Carl A. Gottesman, Avtobus contserna GMC printsipialno novoi construktsii, "Avtomobilnaya promyshlennost SShA", 1975 No. 8, pp. 5-6, FIG. 2). Such design makes it possible to assemble bodies of different lengths in the same assembly jig and to widely apply automatic welding.

The level of unification of the buses of standard size series having the above described module structure of the body is of 40 to 45%.

However, the principle of assemblying buses from separate modules, which is applied only to the body design as above described, practically takes into consideration only one parameter varying within the series, i.e. the bus length. Meanwhile, the bus length is associated with many other parameters, particularly load-carrying capacity (passengers capacity).

In accordance with the existing practice of bus construction, to obtain a bus of a certain standard size, the body assembled from a required number of module elements is mounted on a chassis of a corresponding load-carrying capacity. Since as a rule the chassis of all the buses constituting the standard size series are made in accordance with the biaxial layout, the carrying capacity of the wheel pair is variable within the limits of the series. This fact determines design differences among the chassis in the buses of different load-carrying capacities, and the difficulty of their unification within the standard size series of buses.

Obviously, the wide range of chassis restrains the increase in the capacity of the manufacture of buses, determines a high cost of their production and a wide range of spare parts which results in the complication of repair and operation.

Moreover, since the base distance of a wheel chassis varies with the change in the bus length, the dimension of a module element taken along this length should be multiple of the difference between the base distances of chassis of the neighboring buses in the standard size series. The above requirement causes the need of excessively fractional division of the bus into module elements to obtain an optimum distribution of load between the wheels. The above fractionality of dividing the body results in an increase in the number of module elements which fact, among other things, adversely affects the assembling productivity.

DISCLOSURE OF INVENTION

The invention is based on a problem to provide a module element of a city bus or like vehicle and a bus assembled on the basis of these module elements, which would ensure an increase in the productivity of the manufacture of city buses or like vehicles and a decrease in the cost of their production and repair as a result of introduction of functional units into the module element, said units corresponding to the main variable interrelated parameters of the standard size series of such buses or like vehicles.

The object set forth is attained by that a module element of a city bus or like vehicle, comprising a transverse window section of the body, open at the ends, each of side walls of said section being provided with a window, according to the invention, is provided with a transverse door section of a body, open at the ends thereof, said section being butt-jointed with the window section and provided with a door on at least one of the side walls thereof, and a chassis unit including a pair of wheels disposed under the window and connected to the window section by means of a suspension.

The above described design of the module element makes it possible to combine all the main variable interrelated parameters of the standard size series of city buses or like vehicles, i.e. body length, load-carrying capacity, and door capacity.

With such an arrangement not only the level of unification of busses within the standard size series is increased, but at the same time the range of its unified is decreased. As a result, the process of assemblying each bus is significantly simplified and accelerated, thereby allowing technological specialization of the production as for parts and items to be carried out with a high degree of complex mechanization and automation.

The above consideration provides for the possibility of a drastic increase in the productivity and a decrease in the manufacturing cost of buses.

The introduction of a chassis unit into the module element further allows the load to be distributed more uniformly, thereby ensuring smooth running, increasing the active safety of the bus, and improving its stability. Owing to the uniform load distribution the load acting on the wheel pair is decreased thereby making it possible to significantly reduce the diameter of wheels and to simplify the design of the chassis unit through the application of single wheels in the module element irrespective of whether they function as driving or driven wheels in the bus.

The above arrangement also makes it possible, through the application of independent suspension of each wheel of the module element, to unify the suspension components to the maximum extent. A decrease in the load acting on the wheel pair further results in reducing an unsprung mass, which fact promotes an increase in service lives of both the bus and roadway.

The introduction of a door section of the body into the module element makes it possible to ensure a constant optimum speed of letting in and out passengers of any bus of the standard size series.

All the above described particular improvements of the performance characteristics of buses increase their overhaul period, thereby cutting down repair expenses. The repair cost is also reduced due to the possibility of wider application of the modular method, said possibility arising due to the above described design of the module element.

The object set forth is further attained by the provision of a city motor bus or like vehicle assembled on the basis of module elements, which are connected with with each other and disposed between the front and rear elements of the body.

According to the invention, each module element is constructed as described above, and at least two module elements are connected therebetween through an intermediate section of the body, whose dimensions correspond to those of one of the sections included into the module element.

Any bus of the standard size series can be assembled from the module elements, intermediate section, and front and rear elements of the body. Due to similar dimensions of the intermediate section and of the section included into the module element, a high level of unification of constructive elements of each bus is achieved.

To optimize performance characteristics of the bus comprising more than two module elements, the latter are to be joined in pairs at least on one side of the intermediate section and to face each other with window sections thereof.

Owing to such an arrangement, the wheels of two adjacent module elements can be put together to a maximum extent, thereby providing for compactness of the final drive of the bus and for improvement of its maneuverability and running characteristics.

BRIEF DESCRIPTION OF DRAWINGS

The invention is further explained in terms of specific embodiments thereof with reference to the accompanying drawings, in which:

FIG. 1 shows schematically a general view of the module element of a city bus or like vehicle of the invention;

FIG. 2 shows a sectional view II—II in FIG. 1 (left-hand half relates to a module element provided with steering wheels, while right-hand half relates to a module element having driving wheels);

FIG. 3 shows a sectional view III—III in FIG. 1;

FIG. 4 shows schematically a city bus of the invention, assembled on the basis of two module elements, general view;

FIG. 5 shows a plan view of the bus illustrated in FIG. 4 (the roof and the floor are conditionally transparent);

FIG. 6 shows schematically a city bus of the invention, assembled on the basis of three module elements, general view;

FIG. 7 shows a plan view of the bus illustrated in FIG. 6 (the roof and the floor are conditionally transparent);

FIG. 8 shows schematically a city bus of the invention, assembled on the basis of four module elements, general view;

FIG. 9 shows a plan view of the bus illustrated in FIG. 8 (the roof and the floor are conditionally transparent).

BEST MODE FOR CARRYING OUT THE INVENTION

A module element 1 (FIG. 1) of a city bus comprises, according to the invention, a window section 2 of the body, a door section 3 of the body, jointed with the window section 2, and a chassis unit 4.

The window section 2 is a transverse section of the bus body, open at the ends thereof and comprising a frame 5 (FIG. 2) made in the form of a pair of U-shaped carlines joined therebetween by means of longitudinal and transverse bulkhead structures, two sidewall structures 6 (FIG. 1) fixed on the frame 5 (FIG. 2) opposite each other, a roof structure 7 (FIG. 1) and a floor structure 8 (FIG. 2), completing the section 2 correspondingly from above and from below.

The floor 8 is provided with a projection 9 (FIG. 2) at the side of each sidewall 6 (FIG. 1), said projection forming a wheel recess 10. Each sidewall 6 (FIG. 1) comprises an upper panel 11 provided with a window 12, disposed between the roof 7 and the projection 9 (FIG. 2) of the floor 8, and a lower panel 13 (FIG. 1) jointed from below to the panel 11 and closing the wheel recess 10 (FIG. 2). The panel 13 (FIG. 1) is provided with a cut-out 14 having a flange for the wheel.

In the preferred embodiment of the invention the axis of symmetry of the cut-out 14 is somewhat displaced from the axis of symmetry of the window 12, thereby allowing the base distance between the bus wheels to be adjusted in a required direction by means of various arrangements of the sections 2 and 3 in the module element 1.

The door section 3 is also a transverse section of the bus body, open at the ends thereof. Like the section 2, it comprises a frame 15 (FIG. 3) wherein the U-shaped carlines are connected by longitudinal and transverse bulkheads. The roof 7 (FIG. 1) and one of the sidewalls are similar to those in the section 2. The other sidewall 16 is provided with a door 17. The floor 18 (FIG. 3) is provided with a step 19 (FIG. 3) at the side of the sidewall 16 (FIG. 1).

The unit 4 comprises a pair of coaxially disposed wheels 20 (FIG. 2) connected with the window section 2, said wheels being mounted within the recesses 10 of said section.

In the preferred embodiment of the invention each wheel 20 is coupled to the window section 2 by an independent suspension 21. The suspension 21 includes a support 22 with the wheel 20 rotatably mounted thereon, a frame 23 connected with the frame 5 of the window section 2, and upper and lower levers 24 and 25 respectively each hingedly coupled with one end thereof to the support 22, while the other end is connected with the frame 23. Between the support 22 and the frame 5 is placed a hydropneumatic or another conventional resilient element 26.

Depending on the fact whether the wheel 20 is designed for transmitting the torque from the engine (i.e. is a driving wheel), or for turning the bus from the steering drive (i.e. is a controllable wheel), the support 22 is either coupled with the wheel 20 directly as shown in the right-hand half of FIG. 2 or through a conventional steering knuckle 27 as illustrated in the left-hand half of FIG. 2.

In the first case the suspension comprises an axle shaft 28 (FIGS. 2, 1) constructed as a propeller shaft and connecting the wheel 20 to the bus final drive, while in the second case the steering knuckle 27 is rigidly connected to a steering knuckle arm of the bus steering trapezoid (not shown in FIG. 2).

Since in the bus assembled on the basis of the module elements 1 the load is distributed uniformly, the maximum load per each pair of wheels is significantly less than the critical value, which fact makes it possible to unify the design of the wheels proper irrespective of whether these wheels are driving or steering, and to make all the wheels single tired. The majority of the parts of the suspension 21 are also made similar for all the module elements. All the above specified makes it possible, along with an increase in the level of unification of the buses within a standard size series, to reduce the range of parts utilized for manufacturing each bus of the specified series.

FIG. 4 shows schematically a city motor bus assembled on the basis of two module elements 1. Apart from these elements, said bus includes a front element 29, a rear element 30, and an intermediate body section 31.

The front and rear elements 29 and 30 are end transverse sections of the body. In the preferred embodiment of the bus structure they are made identical and comprise a smoothly bent end wall provided with corresponding glazing.

The intermediate body section 31 is a transverse body section open at the ends thereof, whose dimensions are equal to the corresponding dimensions of one of the sections 2 or 3 of the module element 1 (the dimensions of these sections are identical in the preferred embodiment of the invention).

The design of the section 31 is similar to that of the window section 2 incorporated into the module element 1, except that the former does not have the wheel recesses 10 (FIG. 2) and correspondingly the cut-outs 14 (FIG. 1) in the lower panels 13 (FIG. 4).

However, another design of the intermediate section 31 is possible, e.g. it can be made as the door section 3.

The intermediate section 31 is disposed between the door sections 3 of the module elements 1. The window section 2 of one of these elements adjoins the front element 29, while that of the other element adjoins the rear element 30.

A steering drive 32 is mounted in the bus at the side of the front element 29 (FIG. 5), said drive being connected by means of the steering trapezoid and the steering knuckle 27, 33 connected therewith, to the support 22 within the unit 4 of one of the module elements 1 through the steering Knuckle 27.

In the lower portion of the bus near the unit 4 of another module element 1 is mounted an engine 34 connected with the wheel 20 through a final drive 35 and the axle shaft 28.

The sections 2, 3, 31 and the elements 29 and 30 (FIG. 4) are connected end-to-end and joined therebetween by a welding or other suitable method (e.g. by riveted joint).

FIG. 6 shows schematically a bus assembled on the basis of three module elements 1. The front portion of the bus is formed by the front element 29, the module element 1 jointed to the element 29 with the door section 3 thereof, and the intermediate section 31 adjacent the window section 2 of the module element 1.

The rear portion of the bus is constituted by the rear element 30 and two other jointed module elements 1 facing each other with the window sections 2 thereof, which fact has allowed the geometrical axes of the wheels 20 to be brought closer. This bringing closer is further promoted by such an arrangement of the paired module elements 1 wherein the axes of symmetry of the wheel recesses 10 (FIGS. 1, 2) are displaced from the axes of symmetry of the windows 12 to the side opposite the door section 3. Such an arrangement provides for compactness of the bus final drive, improvement of its running characteristics and maneuverability.

The door section 3 of one of the paired module elements 1 is jointed with the intermediate section 31.

Unlike the bus illustrated in FIGS. 4 and 5, this one is provided with two engines 34 (FIG. 7) connected to the wheels 20 of the module elements 1 of the rear portion of the bus as described above. Naturally, there is possible a modification with one engine 34 and two final drives 35 connected therebetween by an intermediate reduction gear.

The bus illustrated in FIGS. 8 and 9 is assembled on the basis of four module elements 1 jointed in pairs on both sides of the intermediate section 31. The sections 2 and 3 are arranged within the paired module elements 1 as described above.

The steering drive 32 (FIG. 9) is connected to the wheels 20 of two front module elements by means of two steering trapezoids 33 coupled in parallel by an inter-axle side rod 36.

The buses illustrated in FIGS. 4, 6, and 8 are respectively the first, second, and third members of a standard size series of buses wherein each subsequent member is formed by connecting one module element 1 to the preceding member. The number of the module elements determines the length and load-carrying capacity (passenger capacity) of the series members, and the standard size series is formed as a whole corresponding to the structure of the arithmetical progression wherein the elements 29 and 30, and the intermediate section 31 are the first member of the progression, and the module element 1 is the progression difference.

It is obvious that in accordance with this law any member of the standard size series can be assembled including those having a larger number of module elements than that illustrated in FIGS. 4 through 9. Due to the above described design of the module element 1 any bus of the series ensures the same speed of letting in and out passengers.

The above described preferred embodiment of the invention makes it possible to considerably increase the level of unification of units and parts not only within the standard size series but also within each individual bus (identical units and parts constituting all the module elements and the intermediate section). This level reaches the value of 80 to 85% for the buses having a mechanical drive, and of 90 to 95% for those with an electrical drive.

INDUSTRIAL APPLICABILITY

The above described design of the module element has allowed a standard size series of buses proper to be developed rather than a standard size series of bus bodies as in the existing modular bus structures. This provides for the possibility of considerably reducing the time of bus assemblying, thereby increasing productivity of the manufacture thereof.

The high level of unification makes it possible to carry out wide scale mechanization, automation and specialization of bus manufacture, resulting in a decrease in the production cost and in an increase in the output of busses utilizing the same production areas.

The application of multi-axle chassis makes it possible to increase load-carrying capacity of each bus by 15 to 20% as against the buses of the same length provided with a double-axle chassis.

Unification of chassis elements alongside with unification of body units and parts of the bus allows the number of spare parts to be reduced thereby drastically decreasing the labor capacity of maintenance and repair operations. The possibility of expanded application of the repair method based on standard units, arising with such an arrangement, allows the idle time required for repair operations to be shortened.

The high level of unification also makes it possible to reduce the amount of design work and process preparation of production.

The principle forming the basis of the structure of a module element and of a series of buses made with the use of this module element can be also utilized for other vehicles, e.g. trolley-busses.

The claimed module element of a city bus or like vehicle and a bus assembled on the basis of such module elements allow other modifications of embodiments thereof not departing from the scope of appended claims.

We claim:

1. A module element of a city bus or like vehicle, comprising: a tubular body section open at the ends and including opposed side walls, a roof, and a floor structure, each of the side walls of said section being provided with a window, a door provided in one of said side walls and adjacent to a window, suspension means carried by said body section and including a pair of spaced, coaxial wheels disposed under the windows in said side walls, said wheels being rotatable about an axis off-set from the centerline of said windows, and longitudinal and transverse bulkhead structures so that said module element is sufficiently rigid to form a vehicle when interconnected with another module element.

2. A city bus or like vehicle comprising: at least two module elements each including a tubular body having opposed side walls, a roof, and a floor structure, one of said side walls including a first window and the other side wall including a door and a second window opposite to said first window, suspension means carried by said body and including a pair of spaced coaxial wheels disposed under the windows in said side walls, at least two of said module elements being coupled by an intermediate body section whose dimensions correspond to the dimensions of one of the sections incorporated into the module element, said vehicle being of tubular configuration and including front and rear transverse sections defining end walls to provide a closed structure.

3. A city bus as set forth in claim 2, wherein more than two module elements are provided in pairs, the pairs being connected at their ends adjacent their respective windows so that the geometrical axes of the wheels of each module element are closely adjacent to each other.

4. A module element for assembling a unified vehicle from a series of elements, comprising: a body module including pair of opposed side walls having windows, said body module including a floor structure; a chassis submodule including a pair of wheels suspended to an underframe on an independent suspension; a pair of coaxially positioned ribbed wheel tires displaced in relation to the vertical axis of symmetry of the body module; a body submodule connected to one of the ends the body module and having a door provided in a side wall thereof, and stamped crosspieces of undersized height at the base of U-shaped carlines underneath the floor structure to define a step of standard height.

5. A module element as set forth in claim 4, wherein the modules are connected to define a vehicle such as a city bus and its standard size series, said module elements connected in end-to-end relation and to an intermediate body module without wheel arcs, and structurally similar front and rear end elements.

* * * * *